United States Patent [19]
Yamauchi et al.

[11] Patent Number: 5,276,471
[45] Date of Patent: Jan. 4, 1994

[54] IMAGE DISPLAYING DEVICE

[75] Inventors: Toshiyuki Yamauchi; Toshiki Takekuma, both of Kanagawa; Naoki Kamaya, Tokyo; Naoki Okayama, Kanagawa, all of Japan

[73] Assignee: Sony Corporation, Japan

[21] Appl. No.: 697,207

[22] Filed: May 8, 1991

[30] Foreign Application Priority Data
May 17, 1990 [JP] Japan .................... 2-128001

[51] Int. Cl.⁵ .................................. G02C 5/22
[52] U.S. Cl. ........................... 351/153; 351/158
[58] Field of Search ........... 351/121, 123, 153, 158; 2/450; 16/228

[56] References Cited
U.S. PATENT DOCUMENTS

| | | | |
|---|---|---|---|
| 2,756,632 | 7/1956 | Parsell | 16/228 |
| 2,761,353 | 9/1956 | Eustis | 16/228 |
| 3,899,840 | 8/1975 | Maillet | 351/121 |
| 4,105,305 | 8/1978 | Lazarus | 351/158 |
| 5,129,716 | 7/1992 | Halakovszky et al. | 351/158 |

Primary Examiner—Martin Lerner
Assistant Examiner—Hung Xuan Dang
Attorney, Agent, or Firm—Ronald P. Kananen

[57] ABSTRACT

An image displaying device including a light source and liquid crystal panels to be illuminated by the light source in which the main body of the device is installed to a user's head so as to project images of the liquid crystal panels to retina of a user's eyeballs through the light source. There are provided a pair of frames for use in installing the main body of the device to a user's face at both sides of the main body of the device, and a clearance of the pair of frames can be adjusted by an adjusting mechanism.

6 Claims, 9 Drawing Sheets

IMAGE DISPLAYING DEVICE

BACKGROUND OF THE INVENTION

1. Field of the Invention

This invention relates to an image displaying device capable of being applied as a glass type displaying apparatus.

2. Description of the Prior Art

In the prior art, there has been developed an image displaying device having a liquid crystal panel. This type of image displaying device is operated such that a main body of the device is installed at a face surface of a user and an image projected on a pair of liquid crystal panels arranged within the main body of the device is seen with right and left eyes.

However, if the aforesaid image displaying device is set at a user's face and used, a face width of an individual is different from each other, resulting in that it has been quite difficult to align the right and left eyes of the user with a pair of liquid crystal panels arranged within the main body of the device.

In view of the above disadvantage, the present invention may provide an image displaying device capable of being aligned with an individual user's face, in particular, all users faces.

SUMMARY OF THE INVENTION

The present invention provides an image displaying device having a light source and liquid crystal panels projected by the light source within a main body of the device, and the main body of the device is set to user's head to project an image of the liquid crystal panels with the light source against the retinas of both eyeballs, wherein a pair of frames for installing a main body of the device to the user's face are provided, a spacing of a pair of frames is adjustable by an adjusting mechanism, each of the frames is made to be freely extended or retracted, an installing means for installing the main body of the device to the user's face is arranged at the main body of the device, a nose abutting member is arranged at a central part within the main body of the device, the nose abutting member is movable in a forward or rearward direction, thereby the main body of the device can be adjusted to be fitted to all the user's faces and at the same time a clear image can be seen without any relation with a sight power of the user after installing at the face.

A light source and a pair of liquid crystal panels illuminated by the light source are provided within the main body of the device, the main body of the device is installed at a head part of a user, an image on the main body of the device is projected onto retinas of the eyeballs, a pair of frames to install the main body of the device are arranged at both sides of the main body of the device, and a spacing of a pair of frames can be adjusted by an adjusting mechanism.

Another image displaying device is provided with a pair of frames for installing a main body of the device at both sides of the main body of the device and each of the frames can be extended or retracted.

A still further image displaying device is made such that an installing means for installing a main body of the device is arranged in the main body of the device, a nose abutting element is installed at a central part within the main body of the device, and this nose abutting element can be moved in a forward or a rearward direction.

A spacing of a pair of frames is adjusted by an adjusting mechanism, each of the frames is extended or retracted and the nose abutting element is moved in a forward or rearward direction, thereby the main body of the device can be fitted to all faces of the all users. With such an arrangement, it is possible to align the eyes to the positions of the liquid crystal panels when the main body of the device is set at the face and further a clear image can be seen without any relation with a sight power of the user.

DESCRIPTION OF THE PREFERRED EMBODIMENTS

Figure 1:
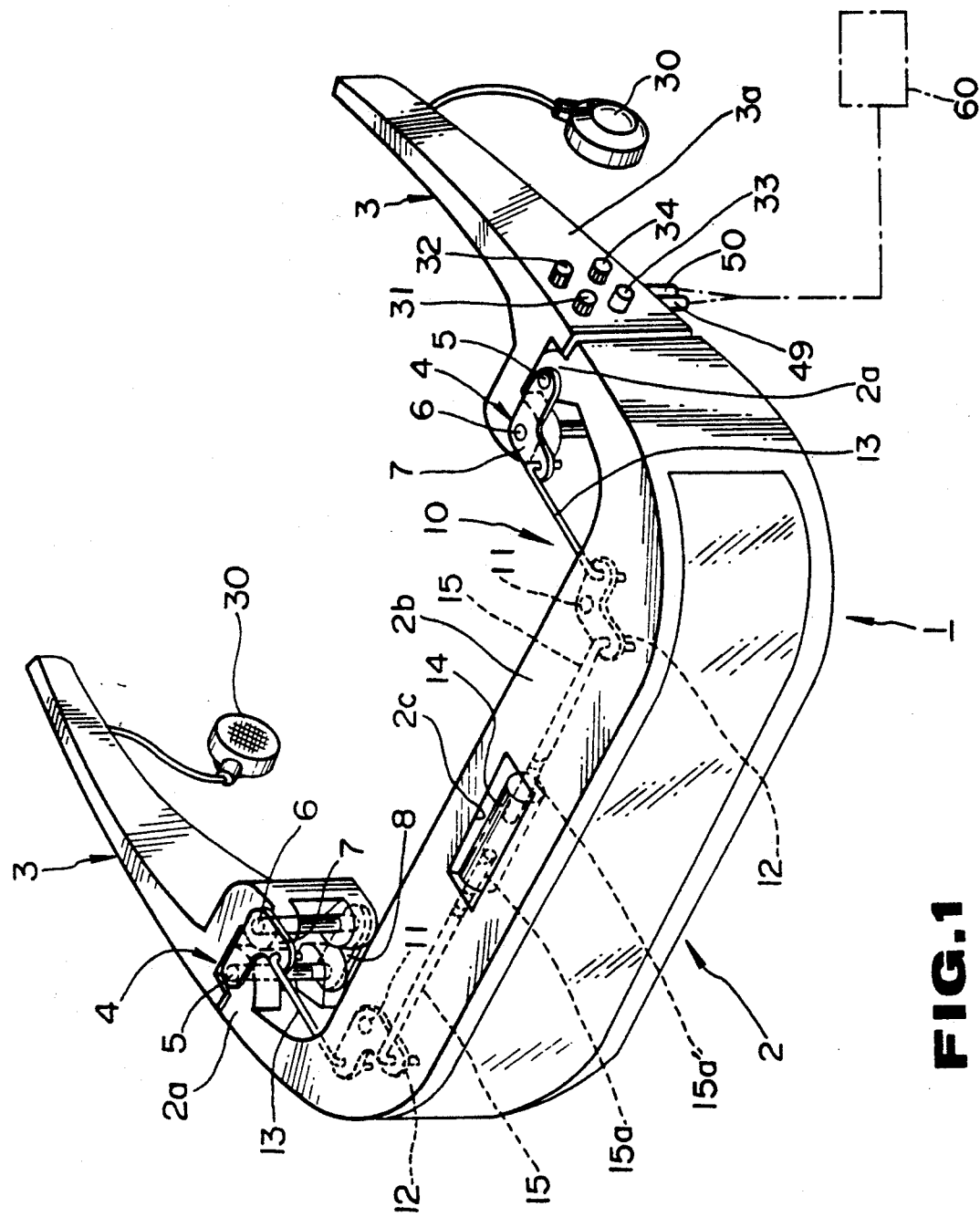
FIG. 1 is a perspective view for showing an image displaying device to illustrate a preferred embodiment of the present invention.

Referring now to the drawings, some preferred embodiments of the present invention will be described.

In FIG. 1, reference numeral 1 denotes an eye glass type image displaying device, wherein its main body 2 of the device is formed into a substantial cubic casing with its face side being opened by an opaque member not capable of seeing an external area therethrough. Each of the base ends 2a, 2a of -shape at both sides of the main body 2 of the device supports a pair of frames 3 and 3 for installing the main body 2 of the device by holding them at a user's ear through each of the hinge means 4 in such a manner as it may be pivoted. Each of the hinge means 4 is composed of a first shaft 5 rotatably supported at each of the base ends 2, the second shaft 6 rotatably supported at a front side 3a of -shape of each of the frames 3, and L-shaped link 7 supported at an upper end of each of these shafts 5 and 6, and a link 8 supported at a lower end of each of the shafts 5 and 6, respectively.

Figure 2:
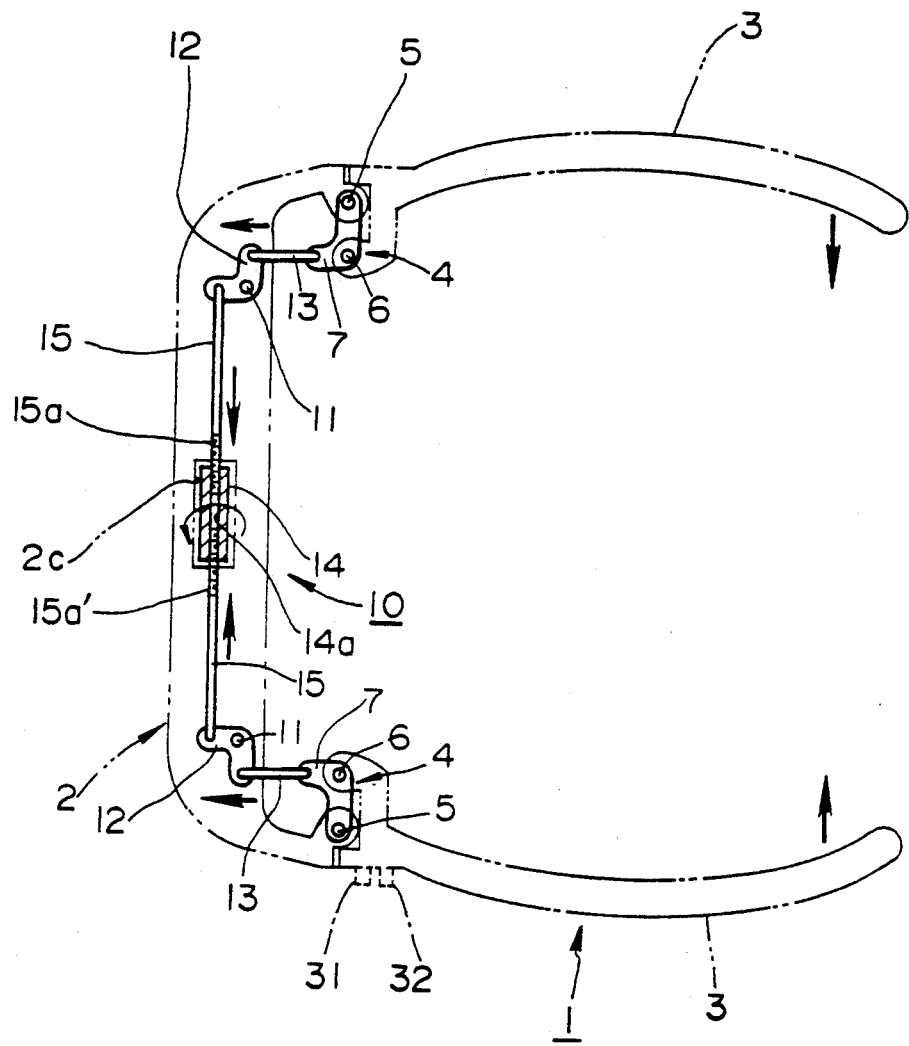
FIG. 2 is a top plan view of an adjusting mechanism for adjusting a pair of frames to be used in the device.

Thus, an adjusting mechanism 10 for adjusting a spacing between a pair of frames 3 and 3 is arranged between the main body 2 of the device and a pair of frames 3 and 3. This adjusting mechanism 10 is composed of each of links 12 and 12 of L-shape rotatably supported by each of the pins 11 at both inner sides of the upper part 2b of the main body 2 of the device; each of the first connecting rods 13 and 13 having both ends bent into an L-shape pivotally supported at one end of the link 7 and one end of the link 12 of each of the hinge means 4; a substantial column-like operating member 14 exposed at a rectangular recess 2c formed at a central part of the upper part 2b of the main body 2 of the device and rotatably supported therein; and each of the second connecting rods 15 and 15 having one end thread threadably engaged with the threaded hole 14a formed at a central part of the operating element 14 and having the other L-shaped bent end pivotally supported at each of the links 12. One end thread 15a of the second connecting rod 15 and the other end thread 15a' of the other second connecting rod 15 are formed to be oppositely threaded and each of them is threadably engaged at both sides of the threaded hole 14a of the operating element 14. Then, as the operating element 14 is rotated in a direction indicated by an arrow in FIG. 2, a pair of frames 3 and 3 are moved in such a direction as to approach at an equal distance to each other through each of the connecting rods 13 and 15 or the like. As the operating element 14 is rotated in a direction opposite to the arrow direction in FIG. 2, a pair of frames 3 and 3 are moved in a direction equally spaced apart from each other and then a spacing between a pair of frames 3 and 3 can be adjusted.

Figure 3:
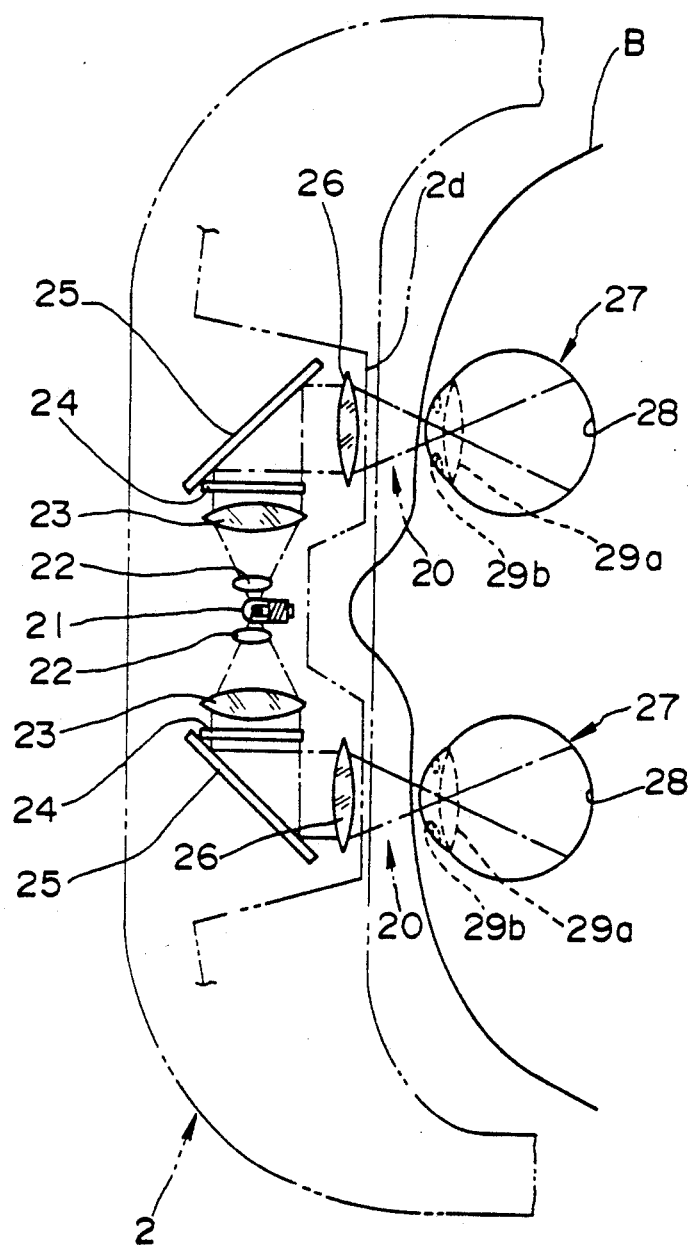
FIG. 3 is an illustrative view for showing an optical system of the device.

A pair of optical systems 20 and 20 for displaying an image are arranged over positions corresponding to each of the right and left eyeballs 27 within the main body 2 of the device. As shown in FIG. 3, each of the optical systems 10 is comprised of a miniature lamp (a spot light source) 21 arranged at a central part within the main body 2 of the device); each of a pair of small and large lenses 22 and 23 for focusing a light beam of the miniature lamp 21 to both side surfaces of the main body 2 of the device; each of liquid crystal panels 24 and 24 of transparent type illuminated by the light beam of the miniature lamp 21 converged by each of a pair of lenses 22 and 23; each of mirrors 25 and 25 arranged at a location opposing to each of the eyeballs 27 so as to reflect the image of each of the liquid crystal panels 24 and 24; and each of the short focusing convex lens 26 to focus an image reflected by each of the mirrors 25 and 25 to each of the eyeballs 27. This mirror 25 and the liquid crystal panel 24 are integrally formed to each other and can be moved in a rightward or a leftward direction by a moving mechanism not shown. A position of the mirror 25 is aligned with a position of each of the right and left eyeballs 27, the image viewed by each of the liquid crystal panels 24 is directly projected to the retinus 28 of each of the right and left eyeballs 27 by a spot light source of one miniature bulb 21. Reference numeral 29a in FIG. 3 denotes the crystalline lens and reference numeral 29b denotes the pupil. A focusing distance of each of the short focusing convex lens 26 is 2 cm, for instance.

Figure 4:
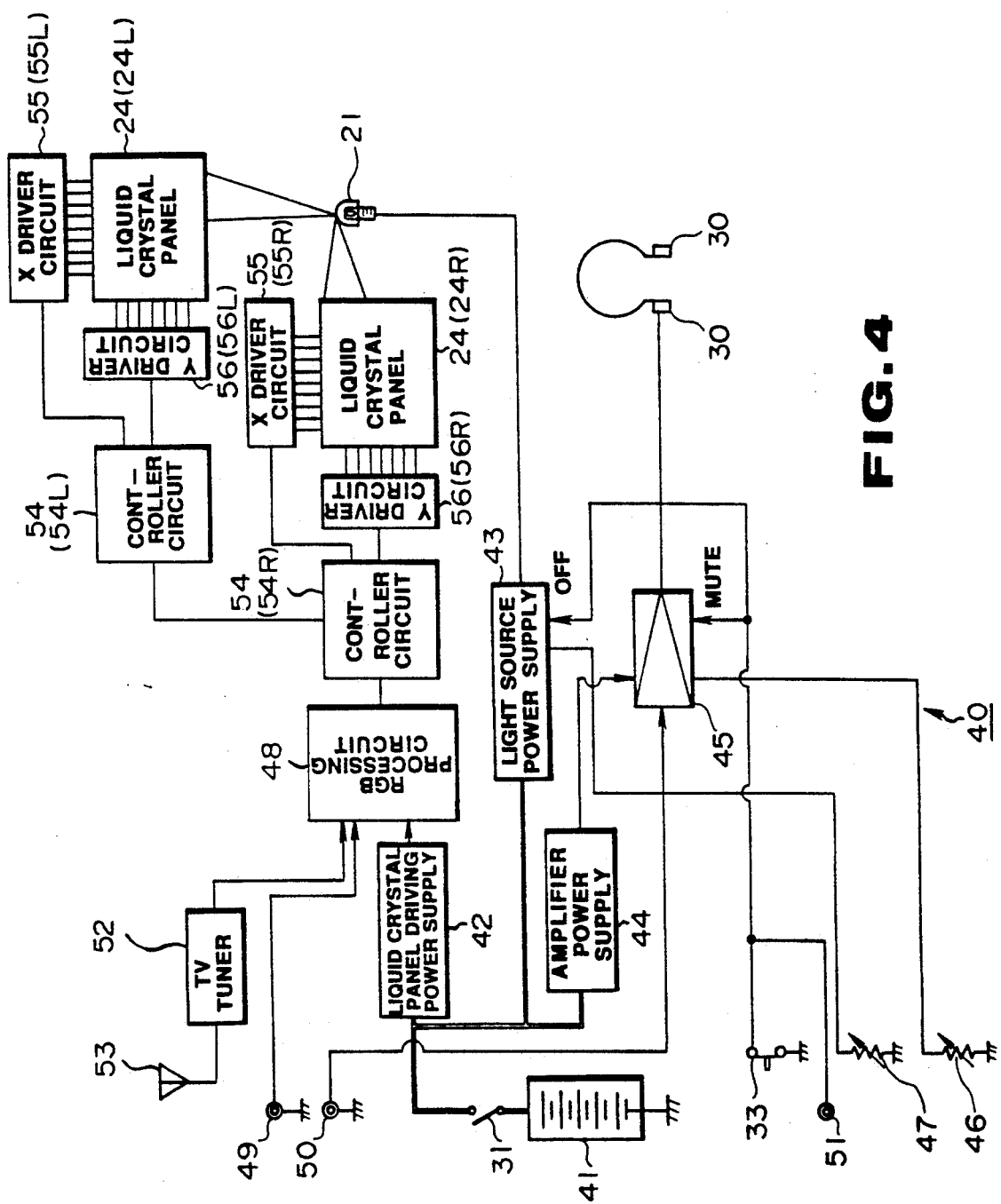
FIG. 4 is a block diagram for showing an image displaying circuit to be used in the device.

The aforesaid pair of frames 3 and 3 are provided with a pair of head-phones 30 and 30 to be fitted into the ears. The front side 3a of the frame 3 stores an image displaying circuit 40. A configuration of the image displaying circuit 40 is indicated in a block diagram of FIG. 4. This image displaying circuit 40 is provided with a battery 41 acting as a power supply 42 for driving the liquid crystal panels, a power supply 43 for a light source and a power supply 44 for an amplifier; a head-phone amplifier 45; a head-phone variable resistor 46 cooperatively connected to a power/sound volume adjusting switch 31 projected at the front end side 3a of one frame 3; a liquid crystal brightness variable resistor 47 cooperatively connected to a liquid crystal panel brightness adjusting knob 32 projected at the front side 3a of the frame 3; a pushing type mute-switch 33 connected to the power supply 43 for the light source and to the head-phone amplifier 45 and projected at the front side part 3a of the frame 3; an image input jack 49 for connecting an image signal from an external unit such as VTR etc. to RGB processing circuit 48; a sound input jack 50 for connecting a sound signal from the VTR to the head-phone amplifier 45; a remote control output (VTR pose output) connected to the mute-switch 33; and a TV tuner 52 connected to the RGB processing circuit 48 and tuned with a TV tuner knob 34 projected at the front side 3a of the frame 3.

An image sinal from the image input jack 49 and another image signal from the TV tuner 52 are inputted to the RGB processing circuit and their signals are processed. Each of the signals R(red), G(green) and B(blue) processed with this RGB processing circuit 48 are inputted to each of the controller circuits 54(54R, 54L) so as to drive each of the liquid crystal panels 24 (24R, 24L) through each of the X driver circuits 55 (55R, 55LO and each of Y driver circuits 56 (56R, 56L), respectively.

One miniature bulb 21 acting a spot light source for each of the liquid crystal panels 24 (24R, 24L) is lit, and when a mute-switch 33 is turned on, the bulb is temporarily diminished and at the same time sound is also simultaneously shut off. Reference numeral 53 in FIG. 3 denotes an antenna for the TV tuner 52 and reference numeral 60 in FIG. 1 denotes a VTR and a video camera or the like.

According to the image displaying device 1 of the aforesaid preferred embodiment, when the main body 2 of the device integrally provided with a pair of liquid crystal panels 24 and 24 of transparent type to be illuminated by a spot light source of one miniature bulb 21 and each of the short focusing convex lenses 26 integrally arranged with each of the liquid crystal panels 24 is installed at a face part B of a head A by a pair of frames 3 and 3, the TV color screen to be projected on each of the liquid crystal panels 24 through TV tuner 52 or the like is directly projected to the ratinus 28 of each of the eyeballs 27 of the user, resulting in that a clear TV color screen can be seen without any relation to a sight power. The VTR and the video camera 60 or the like are connected to each of the jacks 49 and 50 of the main body 20 of the device, a clear color image of the VTR and the video camera 60 or the like can be seen.

When the image displaying device 1 is installed at the face part B, a clearance of a pair of frames 3 and 3 may easily be adjusted by the adjusting mechanism 10, so that the image displaying device 1 is fitted to the face B of each of all users having difference face widths and thus the right and left optical systems 20 and 20 of the main body 2 of the device may easily be aligned with the positions of the right eye and the left eye. In this case, since the clearance of a pair of frames 3 and 3 could easily be adjusted only with the rotating operation of the operating member 14 exposed to the upper surface of the main body 2 of the device, the positions of a pair of frames 3 and 3 can be aligned with the fitting positions under a state where the image displaying device 1 being installed at the face B. The pair of frames 3 and 3 of the right and left sides are simultaneously moved by an equal distance in an opposite direction by rotating one operating element 14, resulting in that if the main body 2 of the device is fitted to the face B, the center of the main body 2 of the device is aligned with the center of the face B, and thus the positions of the right and left eyeballs 27 and 27 of the user can easily be aligned with the positions of the short focusing convex lenses 26 and 26 of each of the right and left optical systems, 20 and 20 of the main body 2 of the device.

Figure 5:
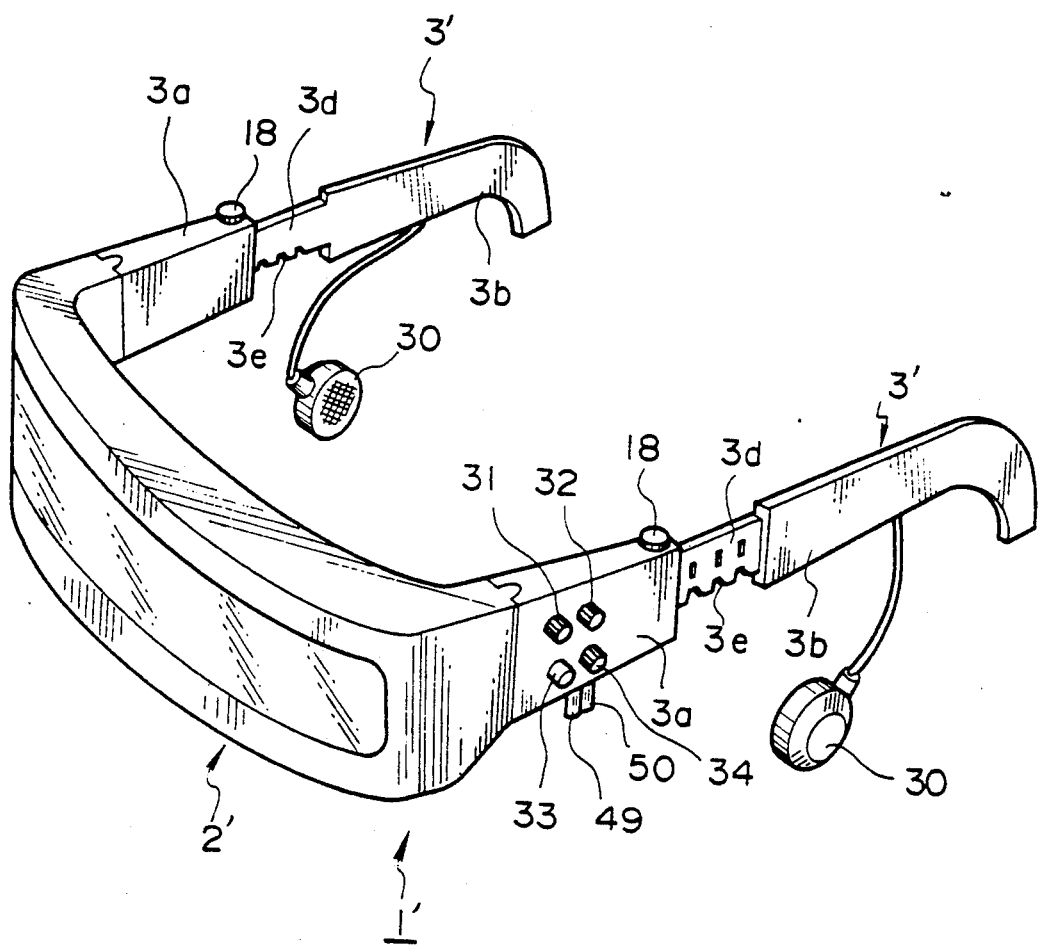
FIG. 5 is a perspective view for showing an image displaying device of another preferred embodiment.
Figure 6:
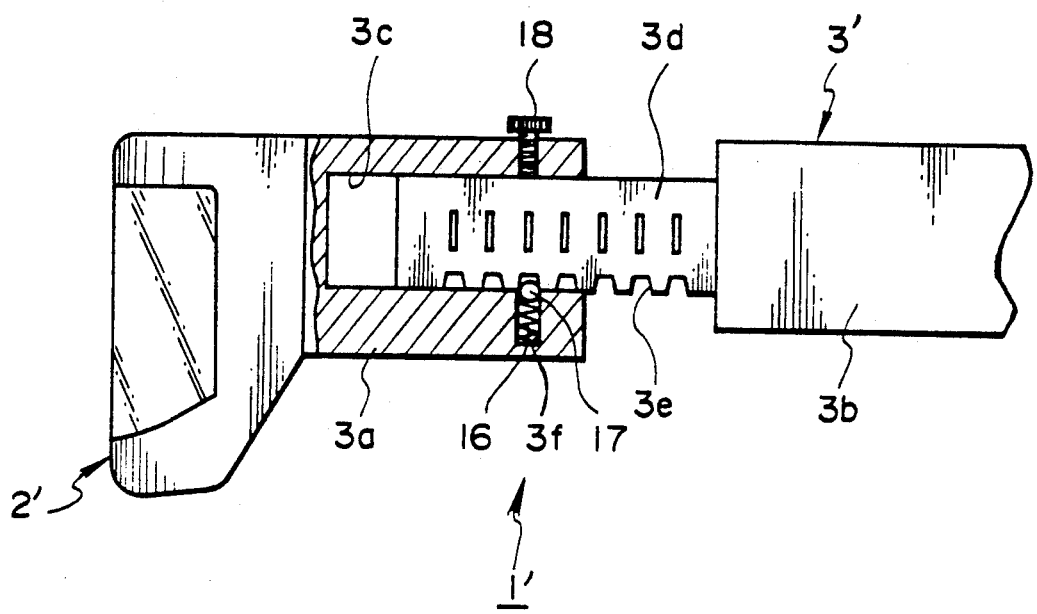
FIG. 6 is a side elevational view in section to show a part of the substantial part of the device.
Figure 7:
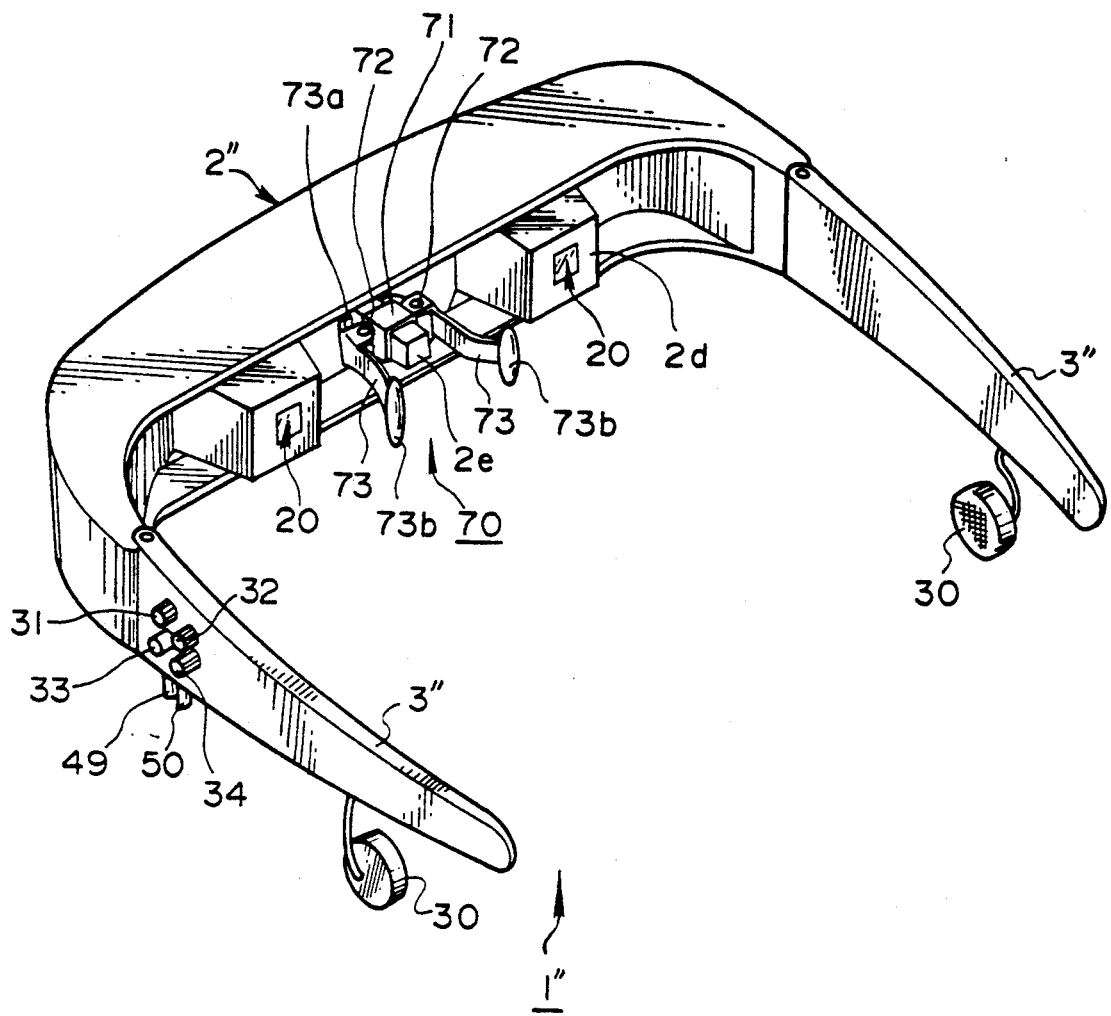
FIG. 7 is a perspective view for showing an image displaying device of a still further preferred embodiment.
Figure 8:
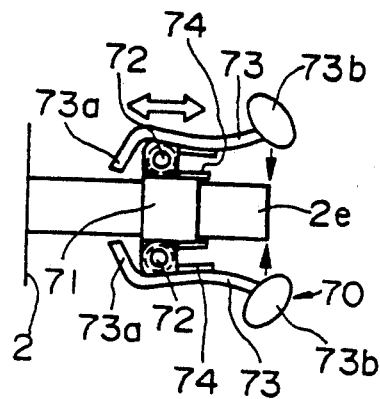
FIGS. 8 and 9 are top plan views for showing a nose abutting element to be used in the device.
Figure 9:
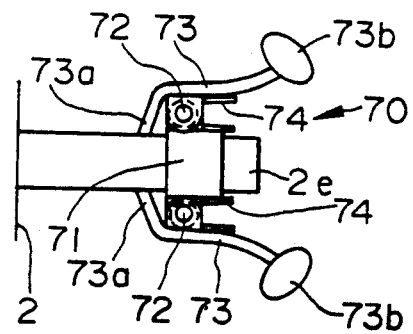
Figure 10:
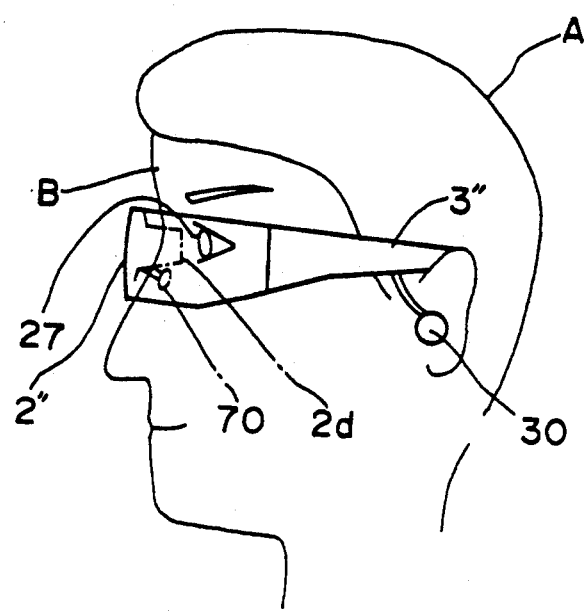
FIGS. 10 and 11 are illustrative views for showing a set state of the device.

FIGS. 5 and 6 illustrate an image displaying device 1' of another preferred embodiment. A pair of frames 3' and 3' arranged at both base ends of a main body 2' of the image displaying device 1' can be extended or retracted. That is, each of the frames 3' is composed of a front part 3a and a rear part 3b. Into a guide lateral hole 3c formed at the front part 3a is fitted a projecting part 3d projected t the rear part 3b. A lower edge of the projecting part 3d is formed with a valley part 3e, and a ball 17 biased by a spring 16 is engaged with a recess 3f formed at the guide lateral hole 3c at the valley part 3e. A fixing screw 18 is threadably engaged from the upper surface of the front part 3a to the guide lateral hole 3c. Then, the rear part 3b is extended or retracted in respect to the front part 3a of each of the frames 3' to enable a length of each of the frames 3' to be adjusted and then the device can be fitted to the faces of all users in the same manner as that of the aforesaid preferred embodiment. In this case, although the rear part 3b is temporarily engaged with the ball 17, after adjustment of the length of each of the frames 3', it is fixed by the fixing screw 18. Another form is the same as that of the aforesaid preferred embodiment, the same reference numerals are applied to the dame portions and their detailed description will be eliminated.

Figure 11:
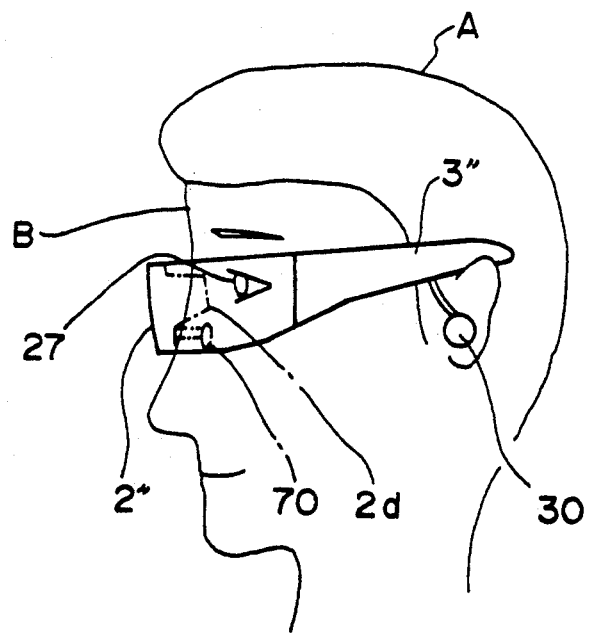

FIGS. 7 to 10 illustrate an image displaying device 1" of another preferred embodiment of the present invention. Each of the base ends of both sides of the main body 2" of the device of the image displaying device 1" are provided with a pair of frames (installing means) 3" and 3" and at the same time a rectangular supporting part 2e projected at the central part of the main body 2' of the device is provided with a nose moving in a forward or rearward direction along the supporting part 2e. That is, this nose abutting member 70 is composed of a rectangular cylinder 71 inserted into the supporting part 2e, a pair of right and left nose abutting pieces 73 and 73 pivotally supported with each of the pins 72 and 72 at both sides of the cylinder 71, and each of substantial V-shaped springs 74 and 74 wound around each of the pins 72 and biased to cause the extreme end 73a of each of the nose abutting pieces 73 to be abutted and engaged with the supporting part 2e. As shown by an arrow in FIG. 8, a nose abutting part 73b of each of the nose abutting pieces 73 is held with a thumb and a forefinger, the nose abutting member 70 is moved in a forward or rearward direction along the supporting part 2e while being pushed against the supporting part 2e against a biasing force of each of the springs 74, thereby it is possible to fit the image displaying device 1" to the face part B of all users such as a user having a high nose shown in FIG. 10 or a user having a low nose shown in FIG. 11. Other configurations are similar to those illustrated in the aforesaid preferred embodiment, so that the same reference numerals are applied to the same portions and their detailed description will be eliminated.

According to each of the preferred embodiments described above, each of the examples of the adjusting mechanism for adjusting a clearance between a pair of frames, a configuration for extending or retracting the frames and forward or rearward moving nose abutting members arranged at the image displaying device has been illustrated. However, all the aforesaid preferred embodiments may be installed in one image displaying device. In addition, in case of another preferred embodiment described above, the means for installing the main body of the device to the face part is not limited by the frames, but various installing means such as a head band or the like may be employed.

As described above, according to the present invention, a pair of frames for installing a main body of the device to a user's face are arranged at both sides of the main body of the device including a light source and liquid crystal panels to be illuminated by the light source, wherein a clearance between a pair of frames can be adjusted by an adjusting mechanism, and further nose abutting member is arranged at a central part within the main body of the device, an image of the liquid crystal panels is projected onto retina of the eyeballs through the light source, resulting in that the main body of the device can be easily fitted to the user's face of any kind, the positions of the right and left eyes may easily be aligned with the positions of the liquid crystal panels and a clear image can be seen without any relation with a sight power.

What is claimed is:

1. An image displaying device comprising:
   a visor-like portion;
   a light source disposed in said visor-like portion;
   first and second liquid crystal panels illuminated by said light source, said liquid crystal panels being arranged to protect images onto retina of the eyes of a person wearing the image displaying device;
   a pair of temples pivotally connected to the sides of said visor-like portion; and
   means for adjusting a distance between the pivotally mounted ends of said pair of temples and the clearance between each of the pivotally mounted ends and said visor-like portion.

2. An image displaying device according to claim (1) in which said pair of temples is simultaneously moved by an equal distance in an opposite direction with respect to said visor-like portion by said adjusting means.

3. An image displaying device according to claim (2) in which said adjusting mechanism includes a single manually rotatable operating member which is supported on said visor-like portion.

4. The image displaying device according to claim (1) wherein said adjusting means includes an adjusting mechanisms comprising hinge members which are each pivotally connected to said visor-like portion at one end and pivotally connected to an end of a temple at the other end.

5. The image displaying device according to claim 1 further comprising a nose support, said nose support being movably supported on said visor-like portion and selectively movable toward and away from said visor-like portion.

6. The image displaying device according to claim 1 wherein said pair of temples includes means for permitting each of the temples to be adjusted in length.

* * * * *